(12) United States Patent
Peng et al.

(10) Patent No.: US 8,385,001 B2
(45) Date of Patent: Feb. 26, 2013

(54) ZOOM PROJECTION LENS SYSTEM

(75) Inventors: Fang-Ying Peng, Taipei Hsien (TW);
Hai-Jo Huang, Taipei Hsien (TW);
Sheng-An Wang, Taipei Hsien (TW);
Xiao-Na Liu, Guangdong (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 12/964,694

(22) Filed: Dec. 9, 2010

(65) Prior Publication Data
US 2012/0113526 A1    May 10, 2012

(30) Foreign Application Priority Data
Nov. 5, 2010   (CN) .......................... 2010 1 0533430

(51) Int. Cl.
*G02B 15/14* (2006.01)
*G02B 15/177* (2006.01)
(52) U.S. Cl. ....................................... 359/649; 359/682
(58) Field of Classification Search .................. 359/676, 359/682–683, 685, 649
See application file for complete search history.

(56) References Cited

U.S. PATENT DOCUMENTS

| | | | | |
|---|---|---|---|---|
| 6,515,803 | B2 * | 2/2003 | Hirose | 359/682 |
| 7,009,776 | B2 * | 3/2006 | Wada | 359/649 |
| 8,072,690 | B2 * | 12/2011 | Nagatoshi | 359/682 |

* cited by examiner

*Primary Examiner* — Ricky Mack
*Assistant Examiner* — Zachary Wilkes
(74) *Attorney, Agent, or Firm* — Altis Law Group, Inc.

(57) ABSTRACT

A zoom projection lens system, in order from the magnification side to the minification side thereof, includes a first lens group with negative refraction power, a second lens group with positive refraction power, a third lens group with positive refraction power, a fourth lens group with negative refraction power; and a fifth lens group with positive refraction power. The first, second, third, fourth lens group are movably positioned, and the fifth lens group is immovably positioned. The first lens group includes a first aspherical plastic lens. The second lens group includes a second aspherical plastic lens. The fourth lens group includes a third aspherical plastic lens. The system satisfies the formula: $-2.4 \leq F_{a1}/F_w \leq -2.1$; $2.9 \leq F_{b1}/F_w \leq 3.2$; $-3.8 \leq F_{a2}/F_w \leq -3.6$, wherein $F_{a1}$, $F_{a2}$, $F_{b1}$ are the effective focal lengths of the first, second, third aspherical plastic lens respectively, Fw is the effective focal lengths of the system in a wide angle state.

10 Claims, 10 Drawing Sheets

ZOOM PROJECTION LENS SYSTEM

BACKGROUND

1. Technical Field

The present disclosure relates to zoom projection lens systems and, particularly, to a zoom projection lens system capable of maintaining optical performance during use.

2. Description of Related Art

Zoom projection lens systems are used in projectors to allow adjustment of effective focal length thereof and thus the projectors can be applied to different spaces, e.g., a spacious hall or a narrow room. When a projector is in use, it will produce large amounts of heat, and so glasses lenses are used in the zoom projection lens system instead of plastic lenses, because the coefficient of expansion of glass lenses is smaller than that of plastic lenses. But glass lenses are more expensive than plastic lenses, making the zoom projection lens systems more expensive to produce.

Therefore, it is desirable to provide a zoom projection lens system which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
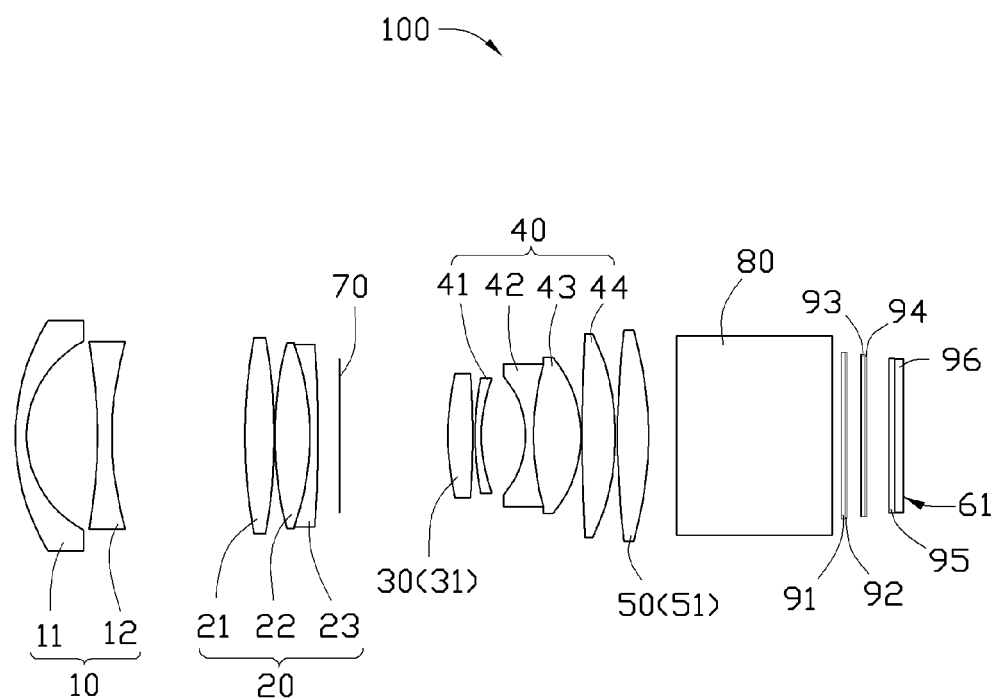
FIG. 1 is a schematic view of a zoom projection lens system in a wide angle state according to an exemplary embodiment.

Referring to FIG. 1, a zoom projection lens system 100 in one exemplary embodiment includes, in this order from the magnification side to the minification side thereof, a first lens group 10 having negative refraction power, a second lens group 20 having positive refraction power, a third lens group 30 having positive refraction power, a fourth lens group 40 having negative refraction power, and a fifth lens group 50 having positive refraction power.

Figure 2:
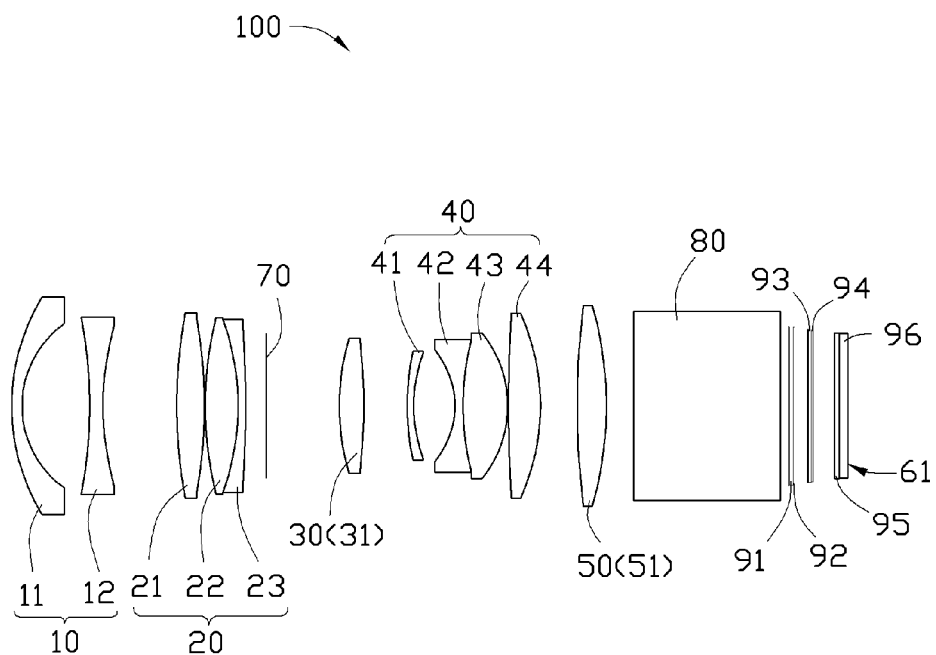
FIG. 2 is a schematic view of the zoom projection lens system of FIG. 1 in a telephoto state.

The fifth lens group 50 is immovably mounted to prevent unwanted contact between a digital micro-mirror device (DMD) and the fourth lens group 40, while the lens groups 10, 20, 30, 40 are movably mounted. Thereby, the effective focal length of the zoom projection lens system 100 can be adjusted by moving the lens groups 10, 20, 30, 40 along the optical axis thereof. In particular, the effective focal length can be reduced by moving the lens groups 10, 20, 30, 40 to any point toward the minification side of the zoom projection lens system 100 until they reach a maximum wide angle state as shown in FIG. 1. Conversely, the effective focal length can be increased by moving the lens groups 10, 20, 30, 40 to any point toward the magnification side of the zoom projection lens system 100 until they reach a maximum telephoto state as shown in FIG. 2. In the embodiment, the zoom projection lens system 100 is configured for utilization in a DLP projector. The DLP projector is typically equipped with a DMD used for modulating light signals for projection through the zoom projection lens system 100. The DMD is located at an image surface 61.

The light signals are transmitted through the fifth lens group 50, the fourth lens group 40, the third lens group 30, the second lens group 20, and the first lens group 10 in sequence, and then projected onto a projection surface (not shown) to produce images.

The first lens group 10 includes, in this order from the magnification side to the minification side of the zoom projection lens system 100, a first spherical lens 11 and a first aspherical plastic lens 12 having negative refraction power. The second lens group 20 includes, in this order from the magnification side to the minification side of the zoom projection lens system 100, a second aspherical plastic lens 21 having positive refraction power, a second spherical lens 22, and a third spherical lens 23. The third lens group 30 includes a fourth spherical plastic lens 31. The fourth lens group 40 includes, in this order from the magnification side to the minification side of the zoom projection lens system 100, a third aspherical plastic lens 41, a fifth spherical lens 42, a sixth spherical lens 43, and a seventh spherical lens 44. The fifth lens group 50 includes an eighth spherical lens 51. The eight spherical lenses 11, 22, 23, 31, 42, 43, 44, 51 are glass lenses. The second spherical lens 22 and the third spherical lens 23 are adhered together, the fifth spherical lens 42 and the sixth spherical lens 43 are adhered together, and thus to correct the axial chromatic aberration and optimize the optical performance of the zoom projection lens system 100.

In practice, an aperture stop 70 can be interposed between the second lens group 20 and the third lens group 30 to limit the flux of light from the third lens group 30 to the second lens group 20, and thus the light cone of the light rays entering the second lens group 20 will be more symmetrical to control the coma occurring in the zoom projection lens system 100 within a correctable range. In this embodiment, the aperture stop 70 can move with the second lens group 20, and the diameter of the aperture of the aperture stop 70 is unchangeable.

The zoom projection lens system 100 further includes a prism 80, a first flat glass 91, a second flat glass 92, a third flat glass 93, a fourth flat glass 94, a fifth flat glass 95, a protective glass sheet 96 disposed between the fifth lens group 50 and the image surface 61 arranged from the magnification side to the minification side of the zoom projection lens system 100. The first flat glass 91 and the second flat glass 92 are adhered together. The third flat glass 93 and the fourth flat glass 94 are adhered together. The fifth flat glass 95, the protective glass sheet 96 and the image surface 61 are adhered together.

In particular, the light signals are transmitted through, in order, the protective glass sheet 96, the fifth flat glass 95, the fourth flat glass 94, the third flat glass 93, the second flat glass 92, the first flat glass 91, the prism 80 and then enters the five lens groups 50, 40, 30, 20, 10. Different coatings may be applied to the five glasses 91, 92, 93, 94, 95 for various purposes such as filtering.

The zoom projection lens system 100 satisfies the following formulas:

$$-2.4 \leq F_{a1}/F_w \leq -2.1; \tag{1}$$

$$2.9 \leq F_{b1}/F_w \leq 3.2; \tag{2}$$

$$-3.8 \leq F_{a2}/F_w \leq -3.6; \quad (3)$$

wherein, $F_{a1}$, $F_{a2}$, $F_{b1}$ are the effective focal lengths of the first, second, third aspherical plastic lens 12, 21, 41 respectively, $F_w$ is the effective focal lengths of the zoom projection lens system 100 in a wide angle state. The formulas (1)-(3) can limit the relation between the effective focal lengths of the three aspherical plastic lenses and the effective focal length of the zoom projection lens system 100 to ensure the imaging quality of the zoom projection lens system 100 when the temperature of the projector is high. In particular, the refractive index of the first and second aspherical plastic lens 12, 21 change to increase the effective focal length of the zoom projection lens system 100, while the refractive index of the third aspherical plastic lens 31 changes to reduce the effective focal length of the zoom projection lens system 100, therefore, the effective focal length of the zoom projection lens system 100 is maintained at a desired length.

In this embodiment, $F_{a1}=-41.48$ mm, $F_{b1}=56.88$ mm, $F_{a2}=-70.37$ mm, $F_w=18.68$ mm, $F_{a1}/F_w=-2.22$, $F_{b1}/F_w=3.05$, $F_{a2}/F_w=-3.76$.

The aspherical surfaces of the aspherical plastic lenses 12, 21, 41 are shaped according to the formula:

$$x = \frac{ch^2}{1+\sqrt{1-(k+1)c^2h^2}} + \sum A_i h^i,$$

wherein h is a height from the optical axis of the zoom projection lens system 100 to the aspherical surface, c is a vertex curvature, k is a conic constant, and Ai is i-th order correction coefficients of the aspheric surfaces.

In this embodiment, the following symbols are used:

F: effective focal length of the zoom projection lens system 100;

D4: the distance between the first lens group 10 and the second lens group 20 along the optical axis of the zoom projection lens system 100 (i.e. the distance between the minification side surface of the first aspherical plastic lens 12 and the magnification side surface of the second aspherical plastic lens 21 along the optical axis of the zoom projection lens system 100);

D10: the distance between the second lens group 20 and the third lens group 30 along the optical axis of the zoom projection lens system 100 (i.e. the distance between the minification side surface of the third spherical lens 23 and the magnification side surface of the fourth spherical lens 31 along the optical axis of the zoom projection lens system 100);

D12: the distance between the third lens group 30 and the fourth lens group 40 along the optical axis of the zoom projection lens system 100 (the distance between the minification side surface of the fourth spherical lens 31 and the magnification side surface of the third aspherical plastic lens 41 along the optical axis of the zoom projection lens system 100);

D19: the distance between the fourth lens group 40 and the fifth lens group 50 along the optical axis of the zoom projection lens system 100 (the distance between the minification side surface of the seventh spherical lens 44 and the magnification side surface of the eighth spherical lens 51 along the optical axis of the zoom projection lens system 100);

F/No: F number;

2ω: field angle;

R: radius of curvature;

D: distance between surfaces on the optical axis of the zoom projection lens system 100;

Nd: refractive index of lens of d light (wavelength: 587.6 nm); and

Vd: Abbe number of d light (wavelength: 587.6 nm).

The zoom projection lens system 100 of the exemplary embodiment satisfies the tables 1-3.

TABLE 1

| Surface | R (mm) | D (mm) | Nd | Vd |
|---|---|---|---|---|
| Magnification side surface of the first lens 11 | 30.027 | 1.494 | 1.487 | 70.441 |
| Minification side surface of the first lens 11 | 14.42 | 9.644 | | |
| Magnification side surface of the first aspherical plastic lens 12 | −75.209 | 1.9056 | 1.531 | 55.753 |
| Minification side surface of the first aspherical plastic lens 12 | 31.65 | D4 | | |
| Magnification side surface of the second aspherical plastic lens 21 | 67.429 | 3.967 | 1.632 | 23.239 |
| Minification side surface of the second aspherical plastic lens 21 | −76.91 | 0.1309 | | |
| Magnification side surface of the second spherical lens 22 | 51.84 | 4.702 | 1.7432 | 49.221 |
| Minification side surface of the second spherical lens 22 (Magnification side surface of the third spherical lens 23) | −36.46 | 1.099 | | |
| Minification side surface of the third spherical lens 23 | −155.83 | 2.935 | 1.846 | 23.784 |
| Aperture stop 70 | infinity | D10 | | |
| Magnification side surface of the fourth spherical lens 30 | 35.026 | 3.44 | 1.487 | 70.44 |
| Minification side surface of the fourth spherical lens 30 | −95.85 | D12 | | |
| Magnification side surface of the third aspherical plastic lens 41 | 80.265 | 0.872 | 1.632 | 23.23 |
| Minification side surface of the third aspherical plastic lens 41 | 28.68 | 5.95 | | |
| Magnification side surface of the fifth spherical lens 42 | −12.351 | 1.097 | 1.846 | 23.78 |
| Minification side surface of the fifth spherical plastic lens 42 (Magnification side surface of the sixth spherical lens 43) | 36.053 | 6.42 | 1.487 | 70.441 |
| Minification side surface of the sixth spherical lens 43 | −16.605 | 0.1309 | | |
| Magnification side surface of the seventh spherical lens 44 | 222.485 | 4.526 | 1.846 | 23.78 |
| Minification side surface of the seventh spherical lens 44 | −32.524 | D19 | | |
| Magnification side surface of the eighth spherical lens 50 | 116.62 | 4.19 | 1.6204 | 60.343 |
| Minification side surface of the eighth spherical lens 50 | −51.458 | 3.85 | | |
| Magnification side surface of the prism 80 | infinity | 21 | 1.5168 | 64.16 |
| Minification side surface of the prism 80 | infinity | 1.24 | | |
| Magnification side surface of the first flat glass 91 | infinity | 0.55 | 1.458 | 67.82 |
| Minification side surface of the first flat glass 91 (Magnification side surface of the second flat glass 92) | infinity | 0.215 | 1.51 | 68 |
| Minification side surface of the second flat glass 92 | infinity | 1.9 | | |
| Magnification side surface of the third flat glass 93 | infinity | 0.5 | 1.458 | 67.82 |
| Minification side surface of the third flat glass 93 (Magnification side surface of the fourth flat glass 94) | infinity | 0.2 | 1.51 | 68 |
| Minification side surface of the fourth flat glass 94 | infinity | 3.087 | | |
| Magnification side surface of the fifth flat glass 95 | infinity | 0.7 | 1.458 | 67.82 |
| Minification side surface of the fifth flat glass 95 (Magnification | infinity | 1.2 | 1.51 | 68 |

TABLE 1-continued

| Surface | R (mm) | D (mm) | Nd | Vd |
|---|---|---|---|---|
| side surface of the protective glass sheet 96) | | | | |
| Minification side surface of the protective glass sheet 96 (The image surface 61) | infinity | — | | |

TABLE 2

| Surface | Aspherical coefficient |
|---|---|
| Magnification side surface of the first aspherical plastic lens 12 | K = 0; A4 = 2.47728E−08; A6 = −2.40190E−08; A8 = 1.32518E−10; A10 = −9.73536E−13; A12 = 0 |
| Minification side surface of the first aspherical plastic lens 12 | K = −7.971; A4 = 7.25628E−06; A6 = −1.13482E−07; A8 = 2.28143E−10; A10 = −1.24683E−12; A12 = 0 |
| Magnification side surface of the second aspherical plastic lens 21 | K = 0; A4 = −4.37631E−06; A6 = −9.87470E−09; A8 = 1.13300E−10; A10 = 0; A12 = 0 |
| Minification side surface of the second aspherical plastic lens 21 | K = 0; A4 = −1.89894E−06; A6 = −1.33585E−08; A8 = 1.15711E−10; A10 = 0; A12 = 0 |
| Magnification side surface of the third aspherical plastic lens 41 | K = −0.569381; A4 = 2.10814E−04; A6 = −3.90837E−06; A8 = 6.82785E−08; A10 = −6.68693E−10; A12 = 3.27002E−12 |
| Minification side surface of the third aspherical plastic lens 41 | K = 8.9571; A4 = 1.68745E−04; A6 = −4.51479E−06; A8 = 6.82208E−08; A10 = −6.82592E−10; A12 = 2.59674E−12 |

TABLE 3

| | F(mm) | D4 | D10 | D12 | D19 |
|---|---|---|---|---|---|
| Wide angle state | 18.68 | 17.975 | 14.55 | 0.25993 | 0.25993 |
| Telephoto state | 24.28 | 10.509 | 10.414 | 6.259 | 5.247 |

Figure 3:
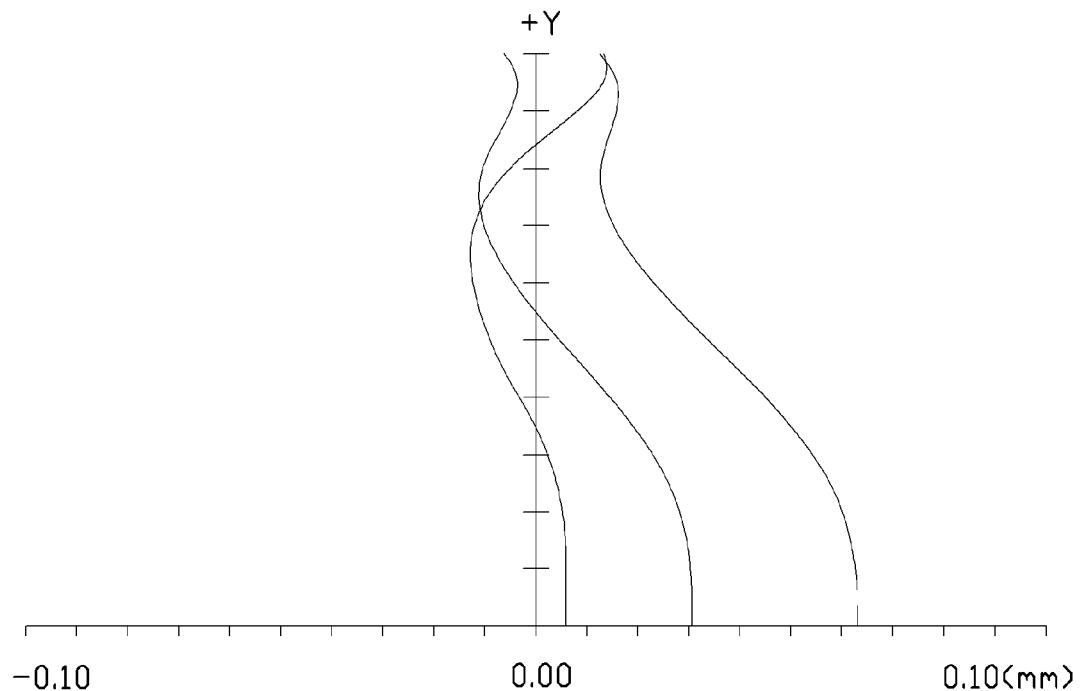
FIGS. 3-6 are graphs respectively showing spherical aberration, field curvature, distortion, and Lateral chromatic aberration occurring in the zoom projection lens system of FIG. 1 in the wide angle state.
Figure 4:
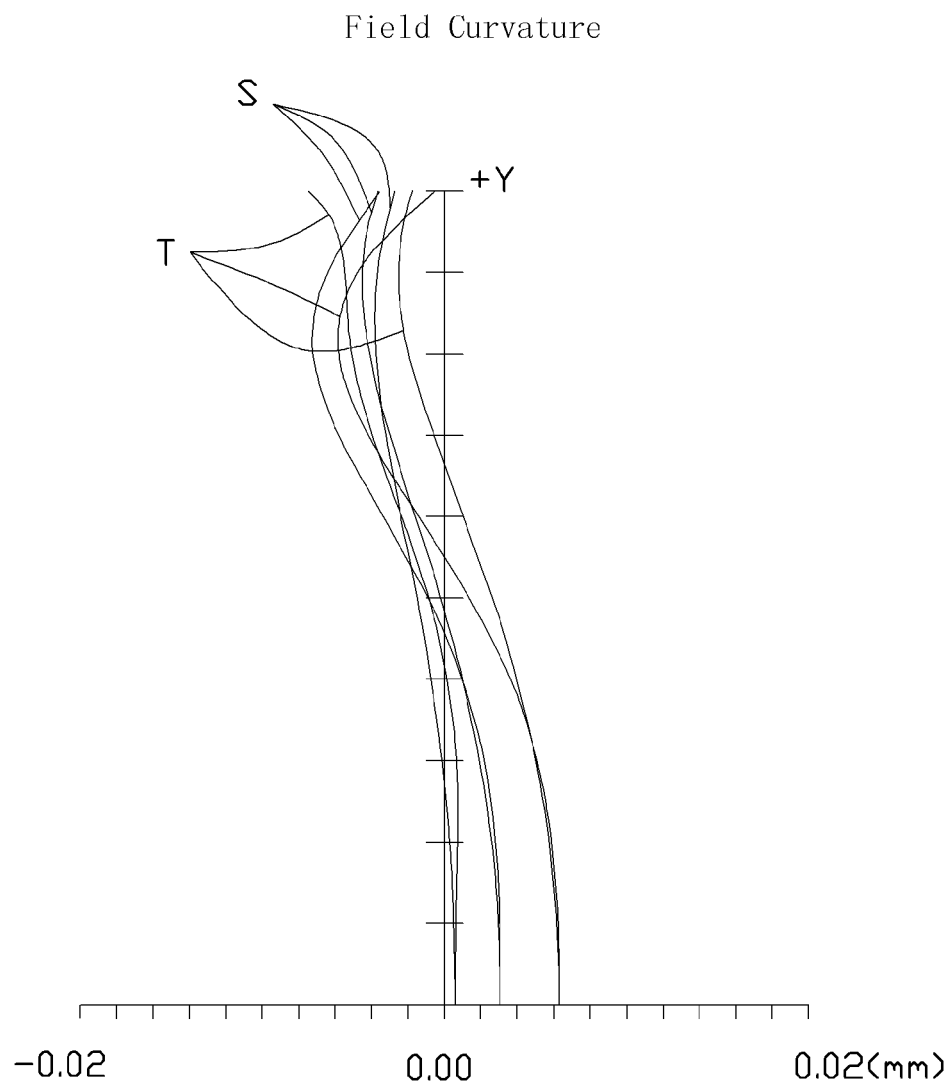
Figure 5:
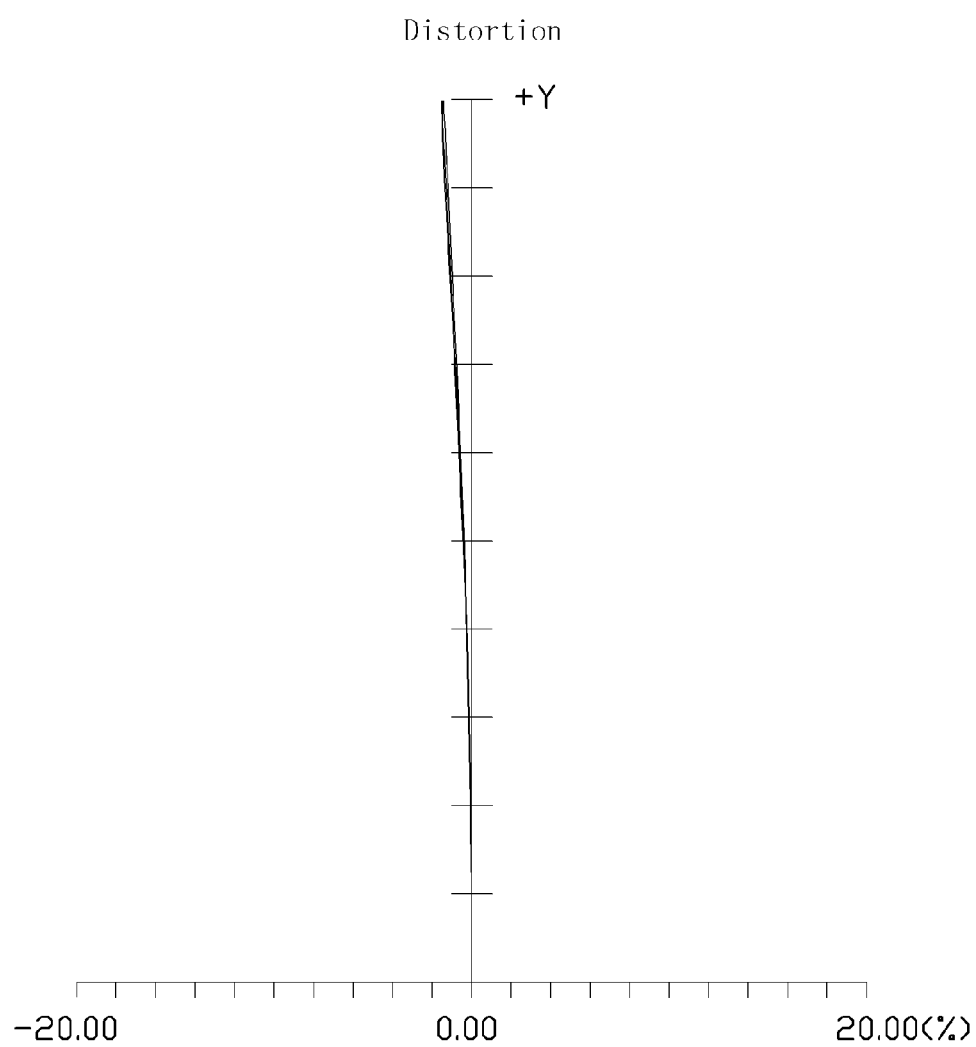
Figure 6:
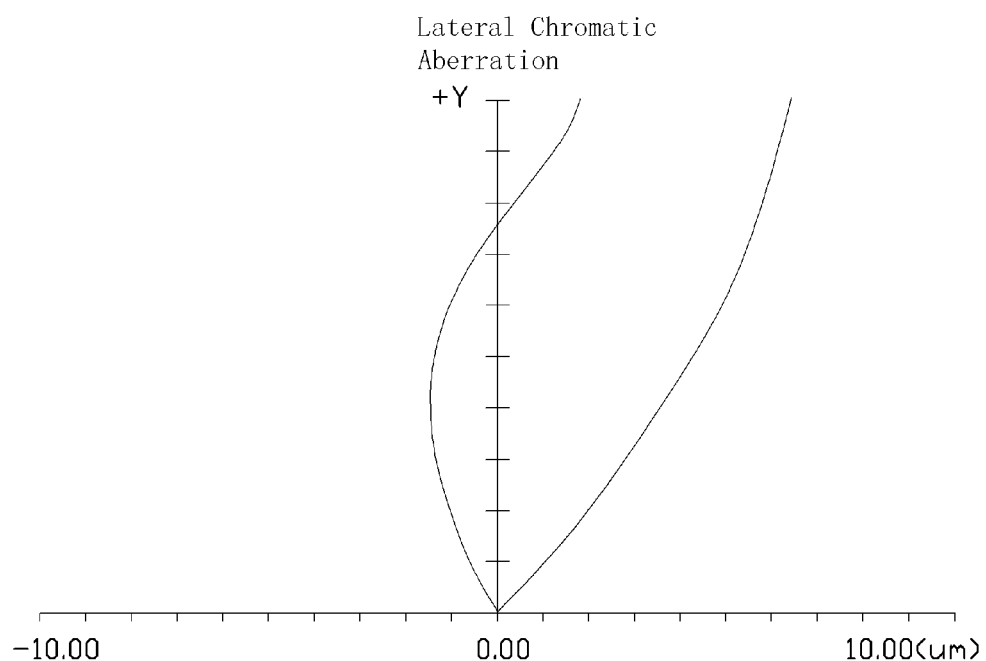

As illustrated in FIG. 3, the curves are respective spherical aberration characteristic curves of light of wavelength 460 nm, light of wavelength 550 nm, light of wavelength 610 nm, occurring in the zoom projection lens system 100 in the wide angle state. Obviously, spherical aberration of visible light (400-700 nm) occurring in the zoom projection lens system 100 of this embodiment is in a range of: −0.1 mm~0.1 mm. In FIG. 4, the curves T and S are the tangential field curvature curve and the sagittal field curvature curve, respectively. Clearly, field curvature occurring in the zoom projection lens system 100 in the wide angle state is limited to a range of: −0.02 mm~0.02 mm. In FIG. 5, distortion occurring in the zoom projection lens system 100 of this embodiment is limited within the range of: −1.5%~0. In FIG. 6, the lateral chromatic aberration of visible light (400-700 nm) occurring in the zoom projection lens system 100 is limited within the range of: −10 μm~10 μm.

Figure 7:
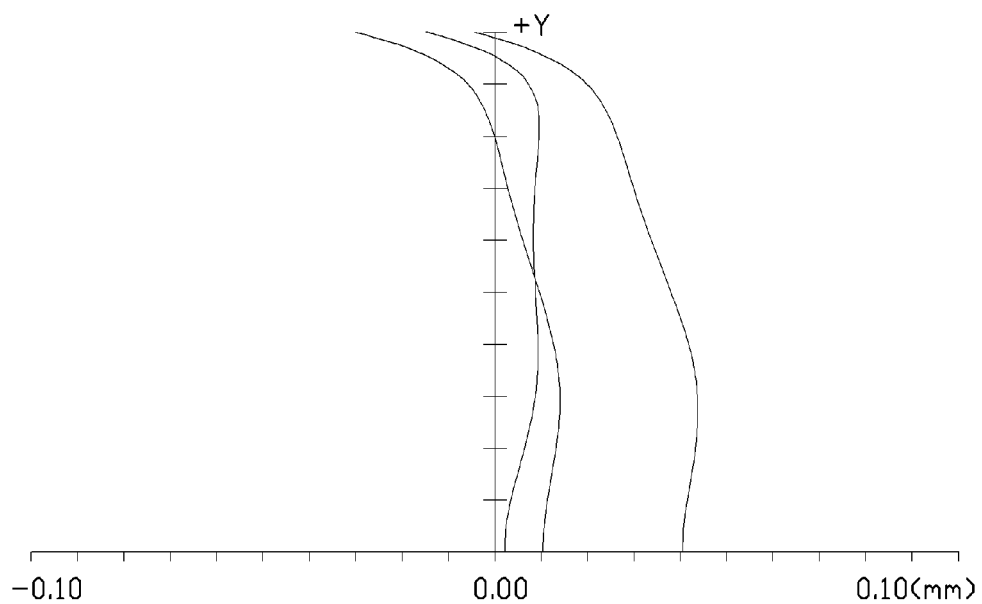
FIG. 7-10 are graphs respectively showing spherical aberration, field curvature, distortion, and Lateral chromatic aberration occurring in the zoom projection lens system of FIG. 2 in the telephoto state.
Figure 8:
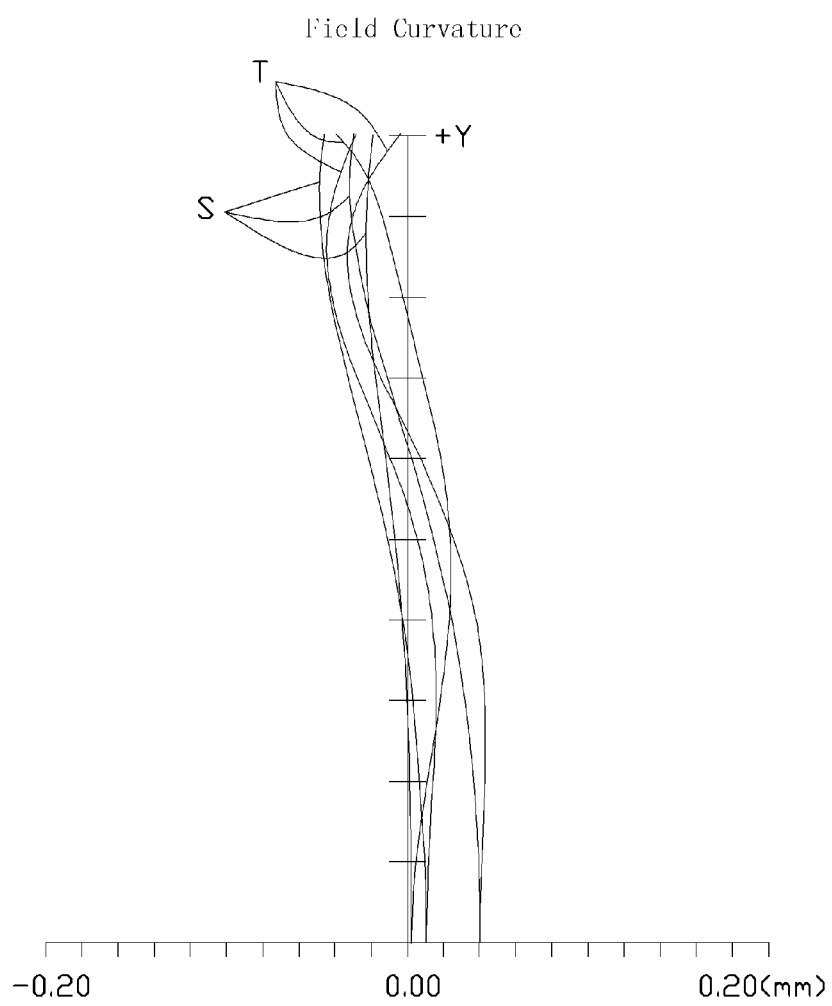
Figure 9:
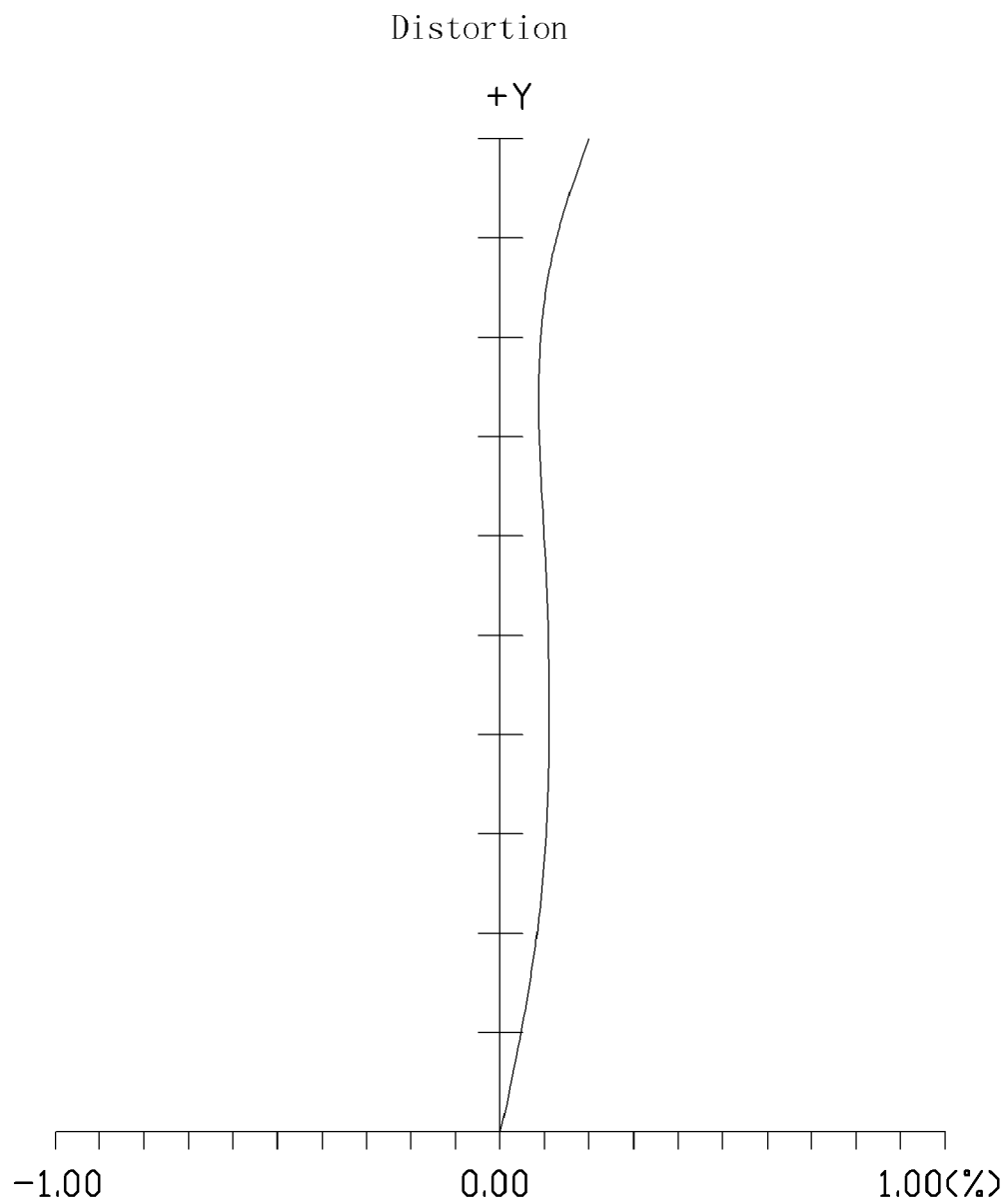
Figure 10:
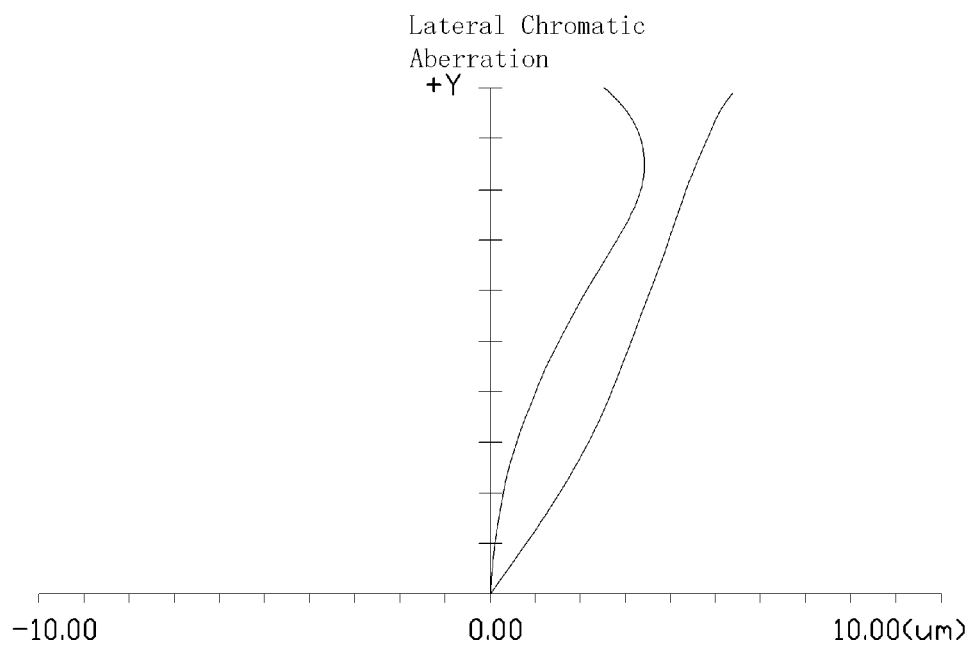

As illustrated in FIG. 7, the spherical aberration of visible light (400-700 nm) occurring in the zoom projection lens system 100 in the telephoto state is in a range of: −0.1 mm~0.1 mm. In FIG. 8, the field curvature occurring in the zoom projection lens system 100 in the telephoto state is limited to a range of: −0.2 mm~0.2 mm. In FIG. 9, distortion occurring in the zoom projection lens system 100 in the telephoto state is limited within the range of: 0~0.2%. In FIG. 10, the lateral chromatic aberration of visible light (400-700 nm) occurring in the zoom projection lens system 100 is limited within the range of: −10 μm~10 μm.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A zoom projection lens system, in order from the magnification side to the minification side thereof, comprising:
    a first lens group with negative refraction power, the first lens group comprising a first aspherical plastic lens;
    a second lens group with positive refraction power, the second lens group comprising a second aspherical plastic lens;
    a third lens group with positive refraction power;
    a fourth lens group with negative refraction power, the fourth lens group comprising a third aspherical plastic lens; and
    a fifth lens group with positive refraction power;
    the first lens group, the second lens group, the third lens group, and the fourth lens group being movably positioned, the fifth lens group being immovably positioned, the zoom projection lens system satisfying the formula:

$$-2.4 \leq F_{a1}/F_w \leq -2.1$$

$$2.9 \leq F_{b1}/F_w \leq 3.2$$

$$-3.8 \leq F_{a2}/F_w \leq -3.6$$

wherein $F_{a1}$, $F_{a2}$, $F_{b1}$ are the effective focal lengths of the first, second, third aspherical plastic lenses respectively, $F_w$ is the effective focal lengths of the zoom projection lens system in a wide angle state.

2. The zoom projection lens system of claim 1, wherein the first lens group further comprises a first spherical lens positioned on the magnification side of the first aspherical plastic lens, the second lens group further comprises a second spherical lens and a third spherical lens positioned on the minification side of the second aspherical plastic lens, the third lens group further comprises a fourth spherical lens, the fourth lens group further comprises a fifth spherical lens, a sixth spherical lens, and a seventh spherical lens positioned on the minification side of the third aspherical plastic lens and arranged from the magnification side to the minification side of the zoom projection lens system, the fifth lens group comprises an eighth spherical lens.

3. The zoom projection lens system of claim 2, wherein the second spherical lens and the third spherical lens are adhered together to form a compound lens, the fifth spherical lens and the sixth spherical lens are adhered together to form a compound lens.

4. The zoom projection lens system of claim 2, wherein the first, second, third, fourth, fifth, sixth, seventh, eighth spherical lenses are glass lenses.

5. The zoom projection lens system of claim 1, wherein the zoom projection lens system further comprises an aperture stop positioned between the second lens group and the third lens group.

6. The zoom projection lens system of claim 5, wherein the aperture stop is capable of moving with the second lens group, the diameter of the aperture stop is unchanged.

7. The zoom projection lens system of claim 1, wherein the zoom projection lens system further comprises an image surface positioned on the minification side of the fifth lens group.

8. The zoom projection lens system of claim 7, wherein the zoom projection lens system further comprises a prism positioned between the fifth lens group and the image surface.

9. The zoom projection lens system of claim 8, wherein the zoom projection lens system further comprises a first flat glass, a second flat glass, a third flat glass, a fourth flat glass, a fifth flat glass, a protective glass sheet immovably positioned between the prism and the image surface arranged from the magnification side to the minification side of the zoom projection lens system.

10. The zoom projection lens system of claim 9, wherein the first flat glass and the second flat glass are adhered together, the third flat glass and the fourth flat glass are adhered together, the fifth flat glass, the protective glass sheet and the image surface are adhered together.

* * * * *